M. M. FISHER.
VARIABLE SPEED GEARING.
APPLICATION FILED APR. 29, 1914.

1,192,777.

Patented July 25, 1916.
3 SHEETS—SHEET 1.

WITNESSES:

INVENTOR
Mayton M. Fisher
BY
Harry C. Schroeder
ATTORNEY

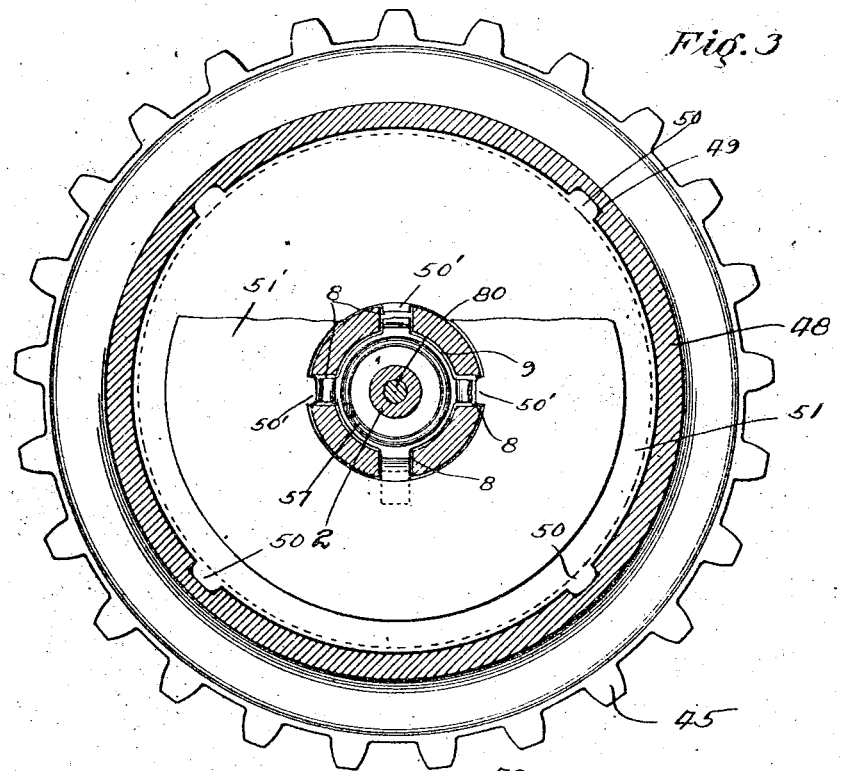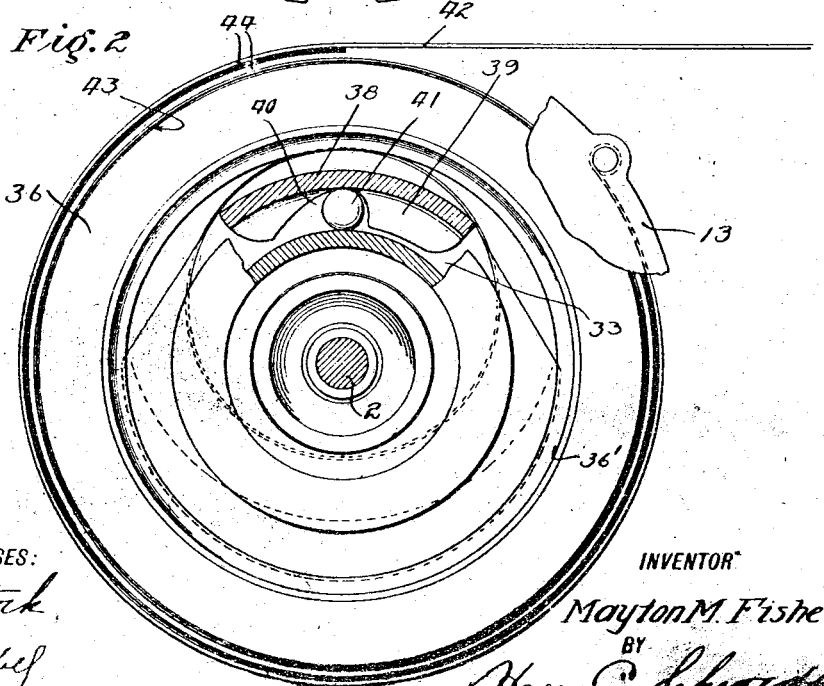

M. M. FISHER.
VARIABLE SPEED GEARING.
APPLICATION FILED APR. 29, 1914.

1,192,777.

Patented July 25, 1916.
3 SHEETS—SHEET 3.

WITNESSES:
H. A. Stock
S. Gibbel

INVENTOR
Mayton M. Fisher
BY
Harry C. Schroeder
ATTORNEY

UNITED STATES PATENT OFFICE.

MAYTON M. FISHER, OF OAKLAND, CALIFORNIA.

VARIABLE-SPEED GEARING.

1,192,777.   Specification of Letters Patent.   Patented July 25, 1916.

Application filed April 29, 1914. Serial No. 835,191.

*To all whom it may concern:*

Be it known that I, MAYTON M. FISHER, a citizen of the United States, residing at Oakland, in the county of Alameda and State of California, have invented certain new and useful Improvements in Variable-Speed Gearing, of which the following is a specification.

This invention relates to improvements in transmission devices and more particularly to means for transmitting power from a motorcycle engine to the rear wheel thereof.

One of the principal objects of this invention is to provide a compact and efficient mechanism located entirely within the rear hub of the motor-cycle wheel by which the power applied thereto is caused to rotate the wheel at one of two different speeds.

Another object is to provide a clutch in connection with the transmitting device whereby the engine may be entirely disconnected from the wheel.

Another object of my invention is to provide transmissions in which only spur gears are used.

With these and other objects in view my invention consists in the novel construction and arrangement of parts as herein described and more specifically pointed out in the appended claims.

Figures 1, 6:
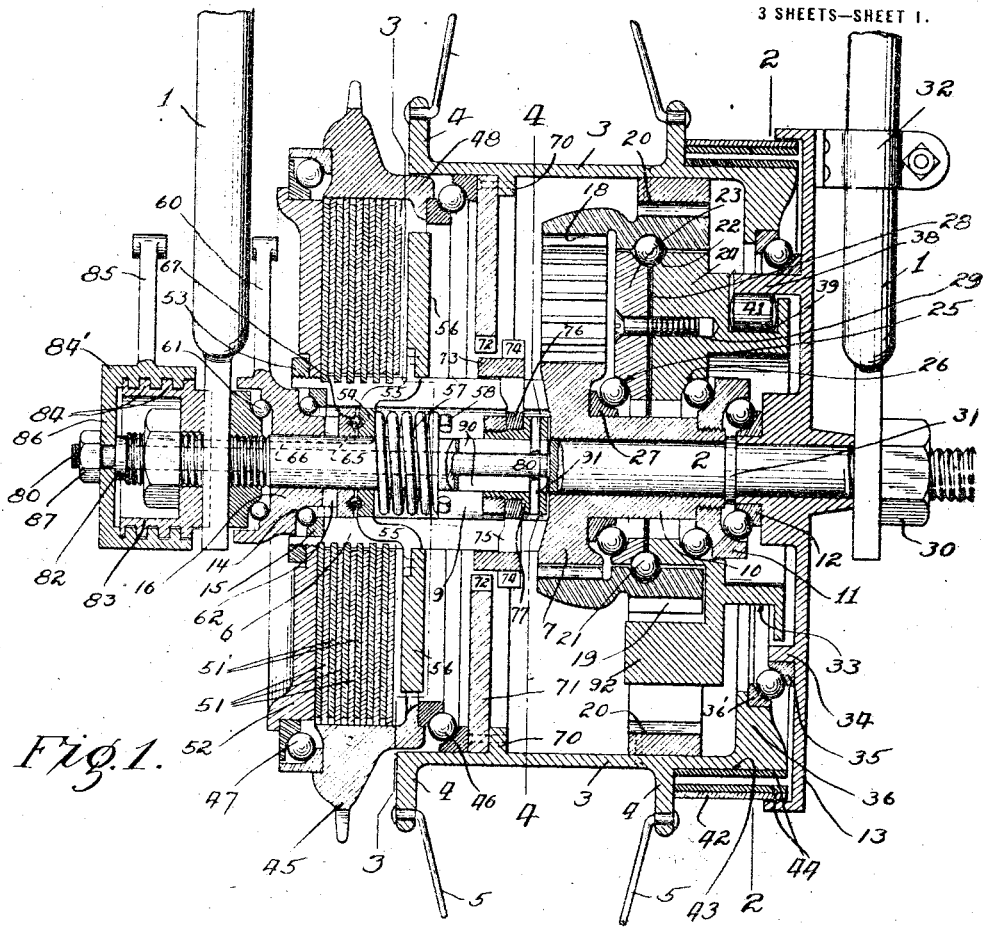
Figure 4:
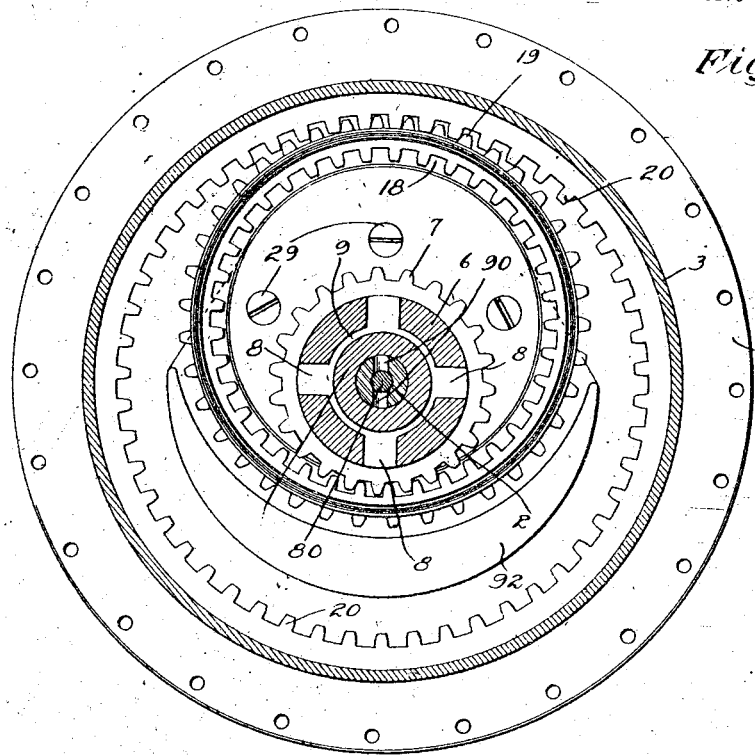
Figure 5:
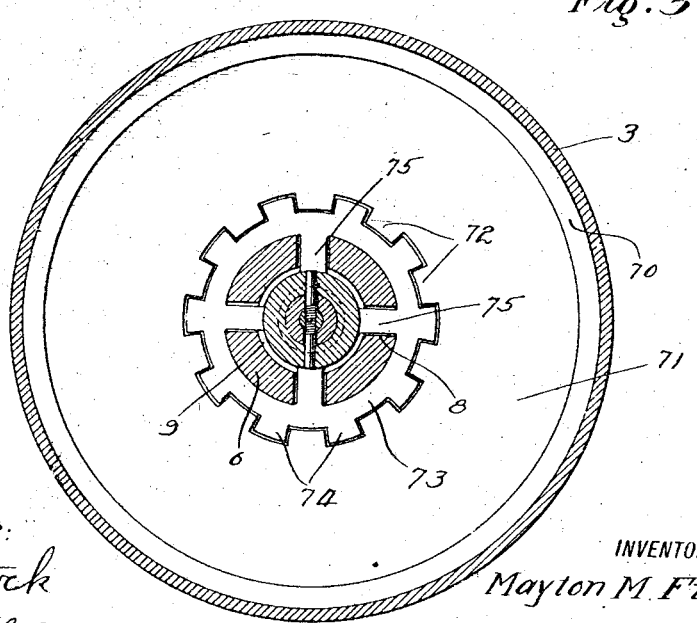

Reference being had to the accompanying drawings forming a part of this specification wherein, Figure 1 is a view in longitudinal section through the rear hub of a motorcycle having my improved transmision installed therein. Fig. 2 is a view in section on 2—2 Fig. 1. Fig. 3 is a view in section on 3—3 Fig. 1. Fig. 4 is a view in section on 4—4 Fig. 1. Fig. 5 is a view on the same line located in the opposite direction. Fig. 6 is a detail view parallel to the axis of rotation showing the hollow sleeves and part contained therein.

Referring to corresponding parts throughout the several views by the same numerals of reference, 1 denotes the rear forks of a motorcycle frame in the lower end of which is held the axle 2.

3 denotes the wheel hub having the usual flanges 4 to receive the wire spokes 5.

Revolubly mounted about the axle 2 is a sleeve 6 having a tooth gear 7 integrally formed intermediate the ends thereof. This sleeve on one side of the gear is provided with a plurality of slots 8 and in the portion thus slotted is an interior bore 9 adapted to receive certain operating devices. The other end 10 of this sleeve is reduced in diameter and threaded to receive the ball race 11, which race contains a groove coacting with a stationary race 12 in the hub of the end plate 13. The opposite end of the sleeve is shouldered, and fitting against the said shoulder is a ball race 15 coacting with a ball race 14 in the sleeve 16, and the said sleeve is revolubly mounted on ball bearings in said races.

The gear 7 meshes with an internal gear 18, which is formed integrally with an external tooth gear 19, which in turn meshes with an internal tooth wheel 20 attached to the interior of the hub 3. The centers of gears 18 and 19 are thus placed eccentric with the centers of sleeve 6, gears 7 and 20, and the former gears 18 and 19 rotate upon a series of balls 21 resting in a race 22 between the disks 23 and 24, which disks in turn are provided with eccentric ball races 25 and 26 coacting with races 11 and 27 upon the reduced end of sleeve 6. The disks 23 and 24 are held in spaced relation by means of thin shims 28 and are held together by screws 29, the removal of the shim permitting adjustment of the ball races.

The disk 13 is held against rotation by the nut 30 clamping the same against a collar 31 formed on the axle 2, also by means of a U-shaped clamp 32 passing around the fork 1. Formed in one side of disk 24 is a rectangular annular groove 33 and disk 13 is provided with an annular flange 34 adapted to carry the ball race 35. Hub 3 has on this end an inwardly extending rim 36, which carries a ball race 36′ coacting with 35, providing one bearing for the hub 3. The upper portion of flange 34 is extended toward the center of the hub as shown at 38 and at this point has a depending flange 39 wherein is a ratchet tooth 40 and a roller 41 seated in this tooth allows the disk 24 to rotate in one direction relative to the plate 13, but prevents such movement in the opposite direction.

Upon the exterior of the hub between the spoke flange 4 and the disk 13 is formed a cylindrical surface 43 upon which a band brake is applied. The band brake denoted by 42 can be of any preferred construction and together with the cylindrical hub surface is lined with a frictional material 44.

45 denotes a sprocket wheel to which the power is applied to a motorcycle engine by means of a chain not shown, and this sprocket is revolubly mounted on ball bearings 46 and 47, the former also serving as a second bearing for the hub 3. The sprocket is formed integrally on a cylindrical annulus 48 having a plurality of axial grooves 49, the said grooves being adapted to receive lugs 50 formed on the exterior of disks 51, which latter form a portion of the multiple disk clutch. The coacting disks 51' of this clutch are provided with the interior lugs 50', which extend into the grooves 8 and are thereby held in fixed relation to the sleeve 6. The outer end of 6 is screw threaded and held thereon by a nut 53 is a plate 52 carrying on its outer periphery a ball race for bearing 47, this plate also serving as an abutment for the clutch disks.

Mounted within the bore 9 is a ring 54 formed with integral arms 55 adapted to slide in the slots 8, and on the outer end of these arms is attached a plate 56, which normally tends to press against the outer disk 51 by means of a spring 57 abutting against certain pins 58 in the interior of cavity 9.

The disk 56 is moved out of contact with the clutch disks through the medium of a lever 60 connected to a suitable operating handle within convenient reach of the rider. This lever is formed on the sleeve 16 pivotally mounted on the axle through the medium of the ball bearing 61. The interior end of this sleeve is formed with a cam surface 62 coacting with a similar shaped cam surface 63 in the ring 64, which latter ring is held against rotation by means of a lug 65 extending in to a groove 66 in the axle 2. Suitable ball bearings 67 are interposed between disks 64 and 54 to eliminate the friction caused by the spring 57. In the hub 3 is formed an interior circumferential rib 70, which serves as an abutment for the plate 71, which plate is provided at the center portion with clutch teeth 72.

Slidably mounted on the exterior of sleeve 6 is a ring 73 having clutch teeth 74 adapted to enter the spaces between clutch teeth 72. This ring is also provided with arms 75, which extend through the slots 8 and within the cavity 9 are connected to a ring 76 mounted on the sleeve 77 slidably along the axle 2. Axial movement is imparted to this sleeve by means of a rod 80 extending through a bore in the axle to the outer end thereof where the said rod is provided with a collar 82.

Mounted on the outside of the fork 1 and held against rotation is a hollow cylindrical sleeve 83 having on the exterior surface a plurality of steep pitched screw threads 84 and in engagement with these screw threads is a sleeve 84' having similar screw threads and an arm 85 by which it may be rotated. The end of this sleeve is closed as at 86 and provided with an opening therein adapted to fit the end of rod 80, the rod being secured thereon by means of a nut 87, which allows the rotation of the sleeve on the rod, but causes the longitudinal movement of the latter with respect to the sleeve 83. Slots 90 are provided in axle 2 through which extend a pin 91 connecting the rod 8 with the sleeve 77. 92 is a counterweight formed integrally on the member 24 adapted to balance this disk with respect to the axis of rotation.

The operation of this transmission is as follows:—When arm 60 is moved rotating ring 16 so as to move the cam surface 62 out of engagement with the corresponding groove of cam surface 63, this forces ring 54 toward the right compressing spring 57, and moving the disk 56 out of engagement with the clutch disks, thus allowing the latter to separate and the sprocket 45 to run free. When it is desired to start the motorcycle the arm 60 is moved in the reverse direction causing the cam surface 62 to drop into the groove in cam surface 63 thus allowing the ring 54 to move to the left under pressure of spring 57, and disk 56 to contact with the outer clutch disk pressing these disks together and frictionally transmitting the movement of sprocket 64 to sleeve 6 and thus to gear 7. The latter in turn transmits the power to gear 18, which being formed integrally with 19 the latter in turn transmits the power to gear 20 and thus to the hub 3 causing rotation of the wheel.

It will be apparent that owing to the ratio between gears 7, 18, 19 and 20, that the hub will turn much more slowly than the sprocket. The gear ratio here illustrated being about 4 to 1. Under these conditions the sleeve 6 rotates in the bearings 19 and 15, the gears 18 and 19 on bearings 21, the member 24 being held stationary through the action of the roller ratchet 40. Now, when it is desired to run at high speed the arm 85 is rotated in such a direction on the threads 84 that the sleeve 84' moves to the left thus moving rod 80 to the left and through the connections, the clutch ring 73, throwing the teeth 74 into contact with teeth 72 thus placing the sleeve 6 in direct communication with the hub. The drive in this case is from the sprocket through the clutches to the sleeve 6, ring 73, the arms of which extend into the slot of sleeve 6, through the coacting clutch teeth, plate 71 to the hub, in which case the hub is rotated faster than the motion which is transmitted through the intermediate gears. These gears being always in mesh cause the members 23 and 24 to be driven in the opposite direction from the driving tendency when gear 7 alone was acting thereon causing the roller ratchet to release its hold and allowing members 23 and 24 to rotate as a whole about the axle 2.

It will thus be seen that I have provided a simple, efficient and compact device which effectively accomplishes the objects set forth in the beginning of the specification, and while I have shown the preferred embodiment of my invention it will be understood that changes may be made in minor details of construction and form of parts, without departing from the scope of the claims.

What I claim is:—

1. A power transmission mechanism of the character described comprising a stationary axle, a sleeve revoluble about said axle, a driving sprocket revoluble about said sleeve, a spoke hub revolubly mounted about said axle, an internally toothed gear attached to said hub, an eccentric disk revolubly mounted about said axle, rigidly connected internally and externally toothed gears revolubly mounted on said eccentric disk, a toothed gear formed on said sleeve adapted to mesh with said internally toothed gear, said integrally connected externally toothed gear meshing with said internally toothed gear attached to said hub, means for connecting said sprocket in driving relation to said sleeve, other means for connecting said sleeve in driving relation to said hub, and ratchet means for holding said eccentric stationary when said first-mentioned connecting means only is in engagement.

2. A power transmission mechanism of the character described comprising a stationary axle, supporting means for said axle, a sprocket revoluble about said axle, a sleeve revoluble on said axle, a disk clutch connecting said sprocket and said sleeve, means to actuate said clutch, a spoke hub revoluble on said axle, a jaw clutch adapted to connect said sleeve and said hub, a toothed spur gear on said sleeve, an eccentrically mounted internally toothed gear meshing with said spur gear, a second spur gear concentric with said internally toothed gear and rigidly mounted with respect thereto, an internally toothed gear concentric with said hub and rigidly attached thereto, said last mentioned gear meshing with said second spur gear, an eccentric disk revolubly mounted about said axle, said first mentioned internally toothed gear and said second mentioned spur gear revolubly mounted on the periphery of said eccentric disk, and ratchet means to prevent the forward rotation of said eccentric disk when said disk clutch only is in engagement with said sleeve.

3. A power transmission mechanism of the character described comprising a stationary axle, a supporting structure for said axle, a spoke hub revolubly mounted about said axle, a sprocket revoluble about said axle, a sleeve revoluble on said axle, a multiple disk clutch adapted to transmit the power from the said sprocket to said sleeve, means to actuate said clutch, an internally toothed clutch member slidably mounted on said sleeve, arms on said clutch member extending through slots in said sleeve to the interior thereof, means connected to said arms for moving said clutch member axially along said sleeve, a coacting clutch disk attached to the spoke hub, a toothed gear formed intermediate the ends of the sleeve, an annulus carrying an internally toothed gear and an externally toothed gear, said first mentioned gear meshing with said internally toothed gear, an internally toothed gear attached to the inside of said hub, said last mentioned gear meshing with the externally toothed gear on said annulus, an eccentric disk revolubly mounted on said sleeve, said annulus revolubly mounted on said eccentric disk said disk having a raceway formed on the side thereof, an end plate for said hub held stationary on said axle and having an inclined recess adjacent the top of said raceway, a roller in said inclined recess to prevent rotation of said disk in one direction and allow movement in the other direction.

4. A variable speed gearing comprising a driving member, a driven member, a fixed axle, a sleeve revoluble on said axle, clutch means for connecting said driving member to said sleeve and other clutch means for connecting said sleeve to said driven member, a toothed gear formed on said sleeve, an eccentric disk revolubly mounted on said sleeve, rigidly connected planetary internally and externally toothed gears revolubly mounted on said disk, an internally toothed gear attached to said driven member and ratchet means for holding said disk stationary with respect to said axle when said driving member is connected to said sleeve by said clutch means and when the driven member is actuated through said rigidly connected planetary gears.

5. A variable speed gearing, comprising a driving member, a driven member, a fixed axle, a sleeve revoluble on said axle, clutch means for connecting said driving member to said sleeve and other clutch means for connecting said sleeve to said driven member, a toothed gear formed on said sleeve, an internally toothed gear formed in said driving member, an eccentric disk revolubly mounted on said sleeve, planetary gears revolubly mounted on said disk and connecting the gear on said sleeve with the gear in said driven member and ratchet means for holding said disk stationary when driving said driven member through said first-mentioned connecting means and said planetary gears.

In testimony whereof I affix my signature in presence of two witnesses.

MAYTON M. FISHER.

Witnesses:
W. A. STOCK,
RUTH E. FISHER.